United States Patent
Dominowska et al.

(10) Patent No.: US 7,577,643 B2
(45) Date of Patent: Aug. 18, 2009

(54) KEY PHRASE EXTRACTION FROM QUERY LOGS

(75) Inventors: Ewa Dominowska, Kirkland, WA (US); Robert Ragno, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 252 days.

(21) Appl. No.: 11/536,970

(22) Filed: Sep. 29, 2006

(65) Prior Publication Data

US 2008/0082477 A1 Apr. 3, 2008

(51) Int. Cl.
G06F 7/00 (2006.01)
G06F 17/30 (2006.01)
G06F 17/00 (2006.01)

(52) U.S. Cl. .......................... 707/3; 707/2; 707/101

(58) Field of Classification Search .............. 707/101, 707/2, 3
See application file for complete search history.

(56) References Cited

U.S. PATENT DOCUMENTS

| | | | |
|---|---|---|---|
| 6,006,225 | A | 12/1999 | Bowman et al. |
| 6,098,065 | A * | 8/2000 | Skillen et al. ............ 707/3 |
| 6,189,002 | B1 | 2/2001 | Roitblat et al. |
| 6,275,820 | B1 | 8/2001 | Navin-Chandra et al. |
| 6,421,675 | B1 | 7/2002 | Ryan et al. |
| 6,675,159 | B1 | 1/2004 | Lin et al. |
| 6,772,150 | B1 | 8/2004 | Whitman et al. |
| 7,043,450 | B2 | 5/2006 | Velez et al. |
| 7,051,023 | B2 | 5/2006 | Kapur et al. |
| 7,146,416 | B1 * | 12/2006 | Yoo et al. ............ 709/224 |
| 2003/0033333 | A1 | 2/2003 | Nishino et al. |
| 2004/0236736 | A1 * | 11/2004 | Whitman et al. ............ 707/3 |
| 2004/0254920 | A1 | 12/2004 | Brill et al. |
| 2005/0065806 | A1 * | 3/2005 | Harik ............ 705/1 |
| 2005/0071741 | A1 * | 3/2005 | Acharya et al. ............ 715/500 |
| 2005/0198068 | A1 * | 9/2005 | Mukherjee et al. ............ 707/104.1 |
| 2005/0234879 | A1 * | 10/2005 | Zeng et al. ............ 707/3 |
| 2006/0004850 | A1 * | 1/2006 | Chowdhury ............ 707/103 R |
| 2006/0253437 | A1 * | 11/2006 | Fain et al. ............ 707/5 |
| 2007/0027865 | A1 * | 2/2007 | Bartz et al. ............ 707/5 |

(Continued)

OTHER PUBLICATIONS

Junichiro Mori et al.. "Keyword Extraction from the Web for Person Metadata Annotation," ISWC Workshop Notes VIII (W8)—4th International Workshop on Knowledge Markup and Semantic Annotation (Semannot2004) (in conjunction with 3rd Int'l Semantic Web Conference (ISWC2004)), Hiroshima, Japan, pp. 51-60, (Nov. 2004).

(Continued)

*Primary Examiner*—James Trujillo
*Assistant Examiner*—Jeffrey A Burke
(74) *Attorney, Agent, or Firm*—Shook, Hardy & Bacon, LLP

(57) ABSTRACT

A method, media and data structure for extraction of keyphrase-content pairs are provided. Query logs having user queries and corresponding web results are processed to generate a content-to-key phrase index that includes key phrases. The query logs are filtered and key phrases are derived from the queries included in the query logs. The key phrases are aggregated based on a repeated content pages in the web results. User behavior and metadata is used to assign scores for each key phrase. The scores are utilized to rank the key phrases. Among other things, the key phrases can be used for advertisement to content matching and content summarization.

16 Claims, 4 Drawing Sheets

U.S. PATENT DOCUMENTS

2007/0260597 A1* 11/2007 Cramer .......................... 707/5

OTHER PUBLICATIONS

Marc Langheinrich et al. "Unintrusive Customization Techniques for Web Advertising," Computer Networks: The International Journal of Computer and Telecommunications Networking, Proceedings of the Eighth International Conference on World Wide Web,. vol. 31 , Issue 11-16 pp. 1259-1272 (May 1999).

T. H. Haveliwala. "Topic-sensitive PageRank: a Context-Sensitive Ranking Algorithm for Web Search," IEEE Transactions on Knowledge and Data Engineering, 15(4):784-796. IEEE (Aug. 2003).

* cited by examiner

KEY PHRASE EXTRACTION FROM QUERY LOGS

BACKGROUND

Conventionally, information retrieval (IR) processing techniques are utilized by applications, such as search engines and advertisement syndication systems to represent content in compact ways. The conventional IR processing techniques are utilized by the applications to organize, search, access, and present information located on the web. Because of the exponential rate at which the web is growing, IR processing techniques have become indispensable for management and access of information.

Some conventional applications build complex language models and utilize training and testing techniques, such as neural networks, to manage and access information included in web documents. However, generating neural networks typically requires human-labeled data, which is limited and very costly.

Other conventional applications manage and access information by calculating term frequency over inverse document frequency (TFIDF), where the frequency of a word or phrase within a document is counted and normalized for the frequency of the word or phrase within the rest of the web. The TFIDF is utilized by conventional applications to organize information and to process user requests. The conventional applications calculate the TFIDF for web documents and extract and store terms as keywords for the web documents. In turn, the extracted terms are categorized, utilized to summarize the web documents, and/or utilized to respond to search requests. The conventional applications that calculate TFIDF, extract terms from web documents that are relevant statistically, but the terms may not be semantically meaningful.

SUMMARY

Embodiments of the present invention extract key phrase-content pairs from query logs. The query logs include queries generated by a user and content that matches the queries. The queries may include terms or concepts corresponding to content that a user seeks to locate. The content may include query results, documents, images, web pages, or content pages. A score is generated for each key phrase-content pair by aggregating key phrases, derived from the queries, based on the appearance of similar content. The score may be augmented based on user interaction with the content. Moreover, the score may be utilized to rank the key phrases. The key phrases that are assigned a score above a specified threshold may be flagged as dominant key phrases. A content-to-key phrase index is generated to store the key phrases, scores, and content. The content-to-key phrase index may be utilized to summarize the content; to select advertisements that correspond to the content; or to summarize the content and select advertisements that correspond to the content.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
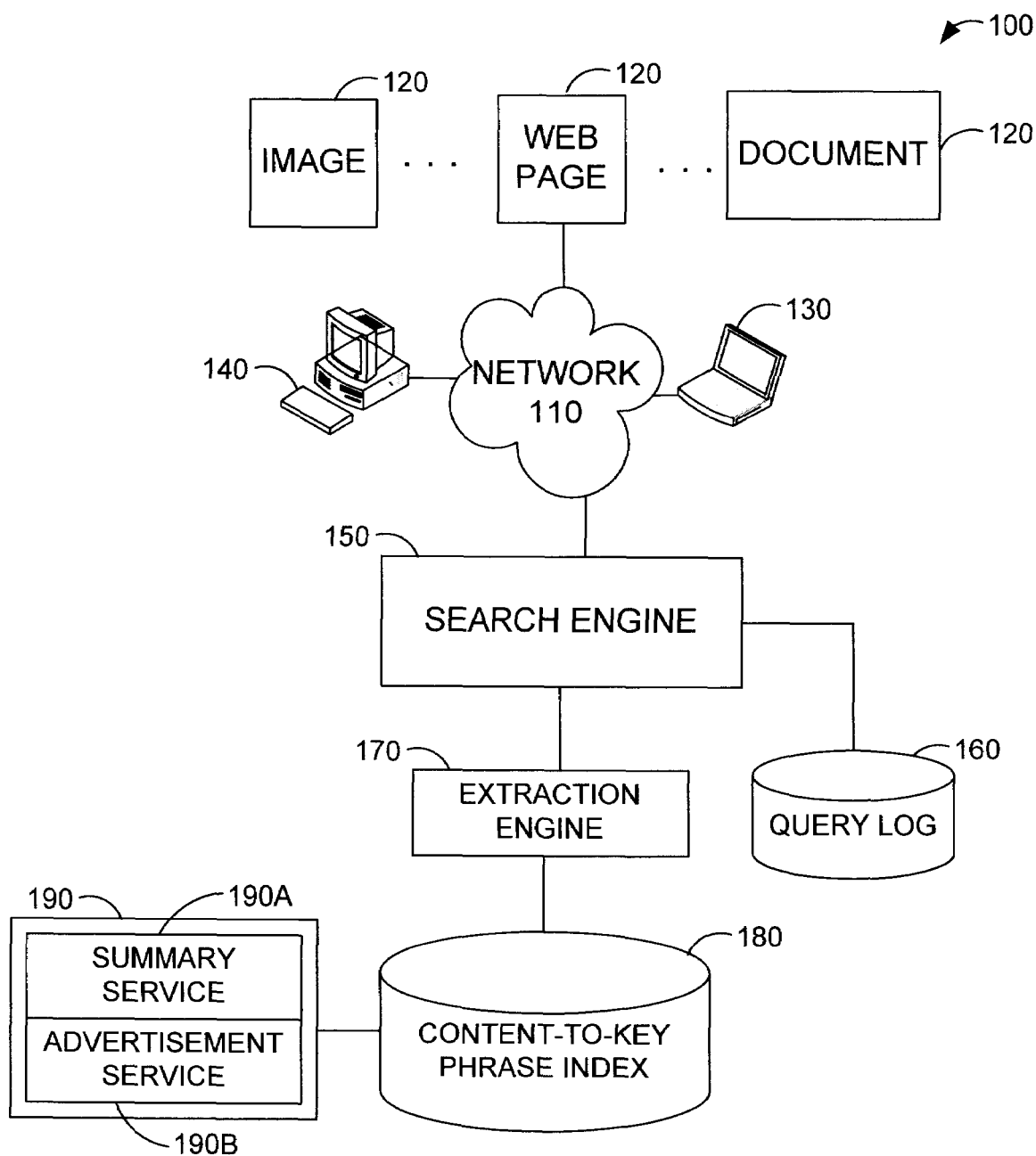
FIG. 1 is a network diagram that illustrates an exemplary operating environment, according to an embodiment of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Further, the present invention is described in detail below with reference to the attached drawing figures, which are incorporated in their entirety by reference herein.

As used herein, the term "content" refers to one or more of the following: query results, uniform resource locators, storage locations, webpages, web documents, images, or other documents that match a user web search. Embodiments of the present invention generate a content-to-key phrase index from query logs. The query logs include information about queries generated by a user and content associated with each query. An extraction engine processes the query logs to identify key phrases, which are one or more terms provided by a user to perform a search. The key phrases may represent a topic or concept that corresponds to the content. The key phrases are derived from the query and may include query terms or document terms, such as title, header, section information, or file name, where the document terms are extracted from documents that match the query. Moreover, the extraction engine generates a score for each identified key phrase. Information about content included in a query log may comprise, for example, user click-through rates that may be utilized to augment the score associated with the identified key phrases. The content-key phrase index stores the key phrases, content, and scores associated with each key phrase.

As utilized herein, the term "component" refers to any combination of software, firmware, and hardware.

In an embodiment of the present invention, the extraction engine includes a filter component, a scorer component, a categorizer component, a monitor component, a ranker component, and an index generator component. The extraction engine receives the query logs, from a search engine and the filter component filters the query logs to provide a filtered query log having key phrases and content. In an embodiment, the query logs are filtered based on one or more of geographic location, user information, time-date information, content information, or other metadata associated with the query. The filtered query logs are processed by the scorer component to generate scores for each key phrase. The categorizer component utilizes the scores to assign each key phrase to a category, such as dominant, tied-to-content, or representative-of-content. The categories assigned to the each key phrase may be utilized to select key phrases phrase that are best suited to summarize content or to select advertisements. The ranker component utilizes the score to prioritize the key phrases based on the numerical value assigned to each key phrase. The monitor component communicates with the search engine to receive user interaction information. The index generator component generates a content-to-key phrase index that includes the key phrases and content included in the filtered query log and scores, ranks, and categories assigned to each key phrase by the extraction engine.

FIG. 1 is a network diagram that illustrates an exemplary operating environment 100, according to an embodiment of the present invention. The operating environment 100 shown in FIG. 1 is merely exemplary and is not intended to suggest any limitation as to scope or functionality. Embodiments of the invention are operable with numerous other configurations. With reference to FIG. 1, the operating environment 100 includes network 110, content 120, client devices 130 and 140, search engine 150, query logs 160, extraction engine 170, content-to-key phrase index 180, and services 190.

The network 110 comprises one or more communication networks that facilitate communication among the client devices 130 and 140, content 120, and the search engine 150. In certain embodiments, the network 110 may include a wired and/or a wireless network. Moreover, the network 110 may be configured to connect the client devices 130 and 140, a local area network, a wide area network, and/or the Internet to access the content 120.

The content 120 may include webpages, images, and/or documents that are provided in response to a user query, such as web search. In an alternate embodiment of the present invention, a resource identifier associated with the content is provided in response to the user query. The content 120 may be distributed across the network 110 and is accessed by a content locator, such as a uniform resource identifier (URI) or uniform resource locator (URL). Accordingly, the content 120 may be accessed by the client device 130 and 140 via the content locator.

The client devices 130 and 140 include personal computers and mobile devices, such as laptops, personal digital assistants or mobile phones. The client devices 130 and 140 are communicatively connected to the network 110. A user may utilize the client devices 130 and 140 to issue queries to the search engine 150 and to receive results from the search engine 150 in response to the queries.

The search engine 150 receives user queries from the client devices 130 and 140 and generates results that includes URLs to the content 120 that matches the user queries. In an embodiment of the present invention, the search engine 150 logs the queries and content 120 or content locators in the query logs 160. Also, the search engine 150 may provide the extraction engine 170 with user interaction information that indicates how the user utilized the results.

The query logs 160 may include information that describes each query generated by a user and the corresponding content 120 or content locators. For example, the query logs 160 may store the geographic location of the user that issued the query, the terms included in the query, and the time the query was issued. In some embodiments, the query logs 160 indicate whether the query was issued from a mobile phone, a personal computer or a personal digital assistant. Also, the query logs 160 may store demographic information, such as gender, age, or education, about the user that issued the query. Accordingly, the query logs 160 are generated by the search engine 150 and processed by the extraction engine 170 to generate the content-to-key phrase index 180.

The extraction engine 170 processes the query logs 160 to extract content, key phrases, and scores associated with each user query. In an embodiment, the extraction engine 170 monitors the user interaction with the query results and augments the score assigned to a key phrase derived from the user query based on the level of user interaction with the query results. For instance, a dwell time, which is a length of time a user spent browsing content selected by the user, may augment the score associated with the key phrase that corresponds to the selected content included in the query results. In some embodiments, when the score is above a specified threshold, the extraction engine 170 indicates that the key phrase is a dominant key phrase. The extraction engine 170 may store the content 120, the score, and key phrases in a content-to-key phrase index 180.

The content-to-key phrase index 180 is a data structure that stores the content 120 or content locators associated with the user queries, and the key phrases and scores derived from the user queries. In an embodiment, the content-to-key phrase index is stored in a look-up table. The content-to-key phrase index 180 provides services 190 with key phrases that may be utilized to summarize the content 120 or that may be utilized to select relevant advertisements.

The services 190 include a summary service 190A and an advertisement service 190B. The summary service 190A utilizes the content-to-key phrase index 180 to summarize the content 120. Additionally, the advertisement service 190B utilizes the content-to-key phrase index 180 to choose dominant key phrases and to select advertisements that correspond to the content 120. One of ordinary skill in the art understands that the operating environment 100 illustrated in FIG. 1 is exemplary, has been simplified to facilitate exposition, and other configurations are within the scope of the present invention.

In some embodiments of the present invention, a content-to-key phrase index is generated by an extraction engine that process query logs having user queries and corresponding results. Queries are human formulated phrases that are issued with the intent of finding content that matches the phrases. The extraction engine may include a monitor component, a scorer component, a filter component, a categorizer component, a ranker component, and an index generator component. The filter component processes the query log to extract key phrases and content corresponding to the key phrases. The scorer component aggregates the key phrases in the query logs and assigns scores that may be augmented by user interactions provided by the monitor component. The categorizer component assigns a category to the key phrases based on the assigned scores. The ranker component assigns an order to the key phrases among the key phrase-content pairs. The index generator component creates the content-to-key phrase index to store the scores, content, and key phrases.

Figure 2:
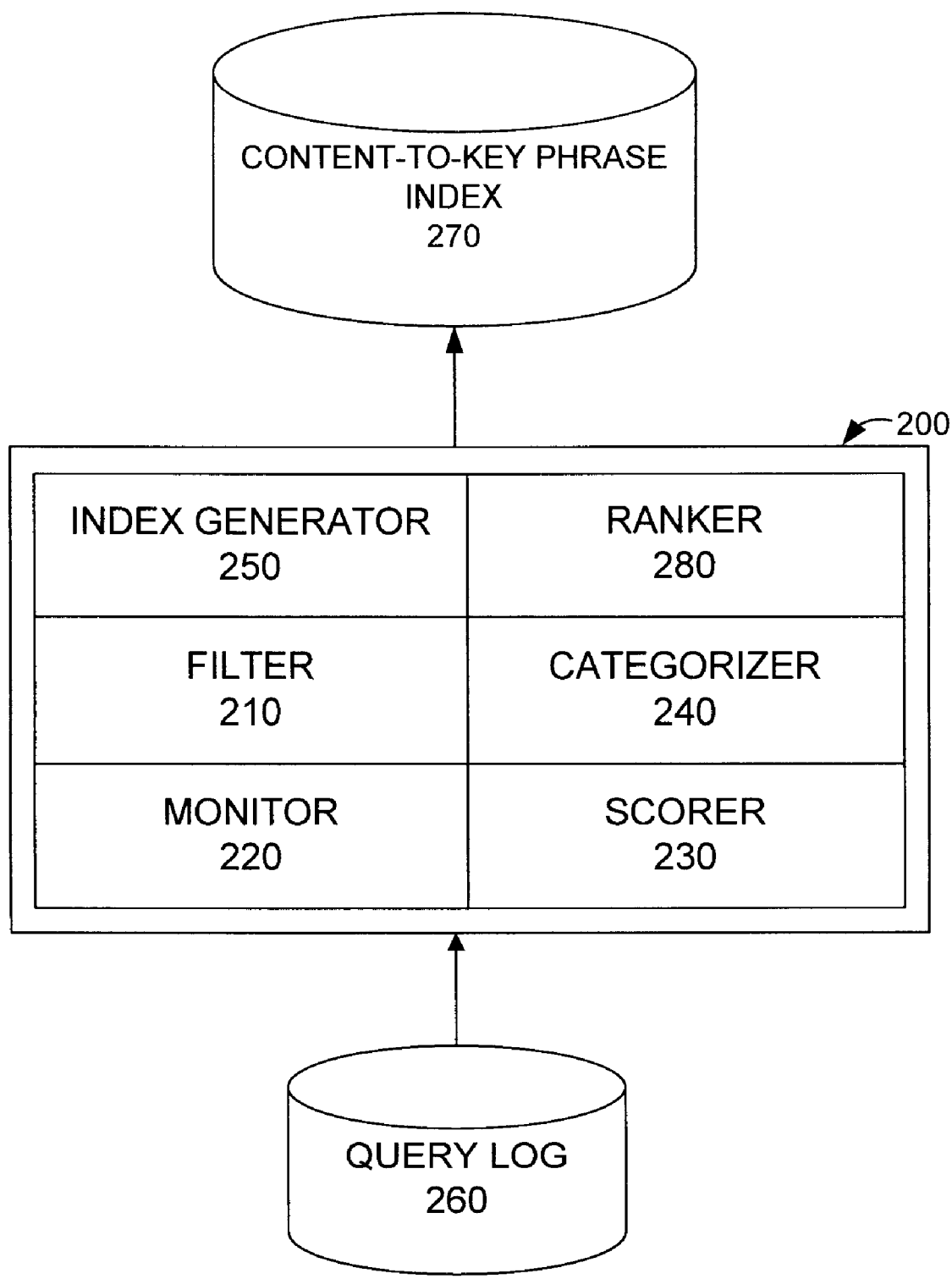
FIG. 2 is component diagram that illustrates an exemplary extraction engine, according to an embodiment of the present invention.

FIG. 2 is component diagram that illustrates an exemplary extraction engine 200, according to an embodiment of the present invention. The extraction engine 200 includes a filter component 210, a monitor component 220, a scorer component 230, a categorizer component 240, an index generator component 250, and a ranker component 280. The extraction engine 200 may process a query log 260 to generate a content-to-key phrase index 270.

A search engine generates the query logs 260 by logging queries issued by users and executed by the search engine. Also, the search engine logs the results returned by the search engine. The search engine stores each query, the selected content or content locator, and a rank assigned by the search engine and associated with the selected content in the query logs 260. In an embodiment, the query logs 260 may store demographic information, such as occupation and education associated with the users. The query logs may also store information about the device that issued the query. That is, the query logs may indicate that a query was issued by a mobile phone, a laptop, personal digital assistant, or personal computer. The query logs 260 may also store a snapshot of the current user interaction information.

The filter component 210 processes the query log 260 to generate a filtered query log. The filtered query log includes the key phrases and associated content. In some embodiments, the filter component 210 is dynamic and may be altered to extract user interaction information that is stored in the query log 260. In certain embodiments, the query logs are filtered based on a geographic location. In alternate embodiments the query logs may be filtered based on any one of geographic information, demographic information, behavioral information, or time-date information, or any other metadata associated with the queries. The filtered query log is sent to the scorer component 230 to calculate a score for each key phrase.

The monitor component 220 communicates with the search engine to receive user interaction information, such as click-through rates and dwell times, which is a length of time spent browsing content. The search engine may provide the monitor component 220 with user interaction information that is utilized by the scorer component 230 and categorizer component 240. In some embodiments, the monitor component 220 observes query patterns to provide indications when key phrases associated with the content or content locators change over time or when a key phrase associated with the content or content locator is stable. In some embodiments, the monitor component 220 provides an indication to the index generator component 250 to set a stable flag for the associated key phrase-content pair indicating a stable key phrase. Moreover, the monitor component 220 may detect changes in language models that reflect updates to the content or seasonal changes associated with the content. For instance, a pet store having a web page that sells animals and animal products may be associated with queries that change during the summer and winter seasons. However, theses queries may be stable for the specified season. In an embodiment, the monitor component 220 processes the detected seasonal changes in the query patterns and informs the index generator 250 to update the corresponding key phrase-content pairs.

The scorer component 230 calculates a score for each key phrase-content pair. Each key phrase-content pair provides a key phrase and the matching content or content locator. In an embodiment, the scorer component 230 aggregates the key phrase-content pairs included in a filtered query log and counts a number of occurrences for each key phrase-content pair to calculate a score. The score provides a relevance score that indicates the strength of relationships between the key phrase and the content. That is, the score may be utilized to determine which terms in the key phrase best describe the content. In an embodiment, the relevance score is normalized by a normalization function. For instance, the normalization function for the score associated with each key phrase may be $$\frac{Score + Maxnumber of\ Results}{Maxnumber of\ Results}.$$

In some embodiments, the scores assigned by the scorer component 230 may be augmented by user interaction behavior. For instance, the scorer component 230 may increase the score associated with a key phrase-content pair based on high click-through rates. Similarly, the scorer component 230 may refine the score based on a rank associated with the content.

For instance, a high content rank may result in a higher score. The scores assigned to the key phrase are utilized by the categorizer component 240 to categorizer the query phrases. Also, the scorer component 230 may transmit the scores for each key phrase-content pair to the ranker component 280 and index generator component 250.

The ranker component 280 process the score to generate an ordering for the key phrases included in each key phrase-content pair. The ordering may specify a priority for key phrases included in key phrase-content pairs. In some embodiments, the key phrases are ordered based on the scores in an increasing fashion. In an alternate embodiment, the key phrases are ordered based on the scores in a decreasing fashion.

The categorizer component 240 may utilize the scores to categorize each key phrase as dominant, stable, seasonal, tied-to-content, or representative-of-content. The categorizer component 240 may generate an indication that informs the index generator 250 to set a flag that represents the associated categories. Alternatively, the categorizer component 240 may generate a list for each category that stores the corresponding key phrase. In some embodiments, a key phrase is indicated as a dominant key phrase when its score is above a specified threshold. Additionally, the categorizer component 240 may categorize a key phrase as seasonal or stable based on the user patterns observed by the monitor component 220. For instance, a key phrase may be classified as stable when the key phrase is constant over a period, such as a year, for particular content. Moreover, when key phrases are utilized during specified periods, such as fall, winter, or summer, the categorizer component 240 may classify the terms as seasonal. The categorizer component 240 may also classify the key phrases as tied-to-content or representative-of-content. In particular, when a key phrase is semantically unique and is always associated with the corresponding content, the categorizer component 240 classifies the key phrase as being tied-to-content. For instance, a name associated with a pet store may always be utilized as a key phrase to access the pet store webpage because the pet store name is very unique. When a key phrase is semantically regular and is associated with other content, the categorizer component 240 classifies the key phrase as being representative-of-content. The categories utilized by the categorizer component 240 may enable the summary service to efficiently access key phrase that summarize content. Additionally, the categorizer component 240 may enable the advertisement service to select relevant advertisements for the content.

The index generator component 250 receives and processes the scores, the filtered query log, and the category indications to generate the content-to-key phrase index 270. The content-to-key phrase index 270 is a reverse index of URLs and associated key phrases and scores. The content-to-key phrase index 270 includes a score, query, and content or content locator. For instance, a key phrase, such as "cat", derived from a query, such as "cat store," may be stored with content associated with a particular pet store or a URL for the pet store and a base score that represents the number of times the key phrase-content pair occurred in the query log 260. In some embodiments, the content-to-key phrase index 270 is utilized as a look-up table that provides key phrases based on the content locators provided. Each key phrase derived from a query that surfaced a particular content locator may be one of the results of a look-up in the content-to-key phrase index 270. The scores assigned to each key phrase may be used to indicate a relevance between the content and the key phrases. Accordingly, the content-to-key phrase index 270 may be utilized to find key phrases that describe content. Moreover, the content-to-key phrase index 270 may be utilized to select advertisements that are relevant to content based on key phrases included in the content-to-key phrase index.

Figure 3:
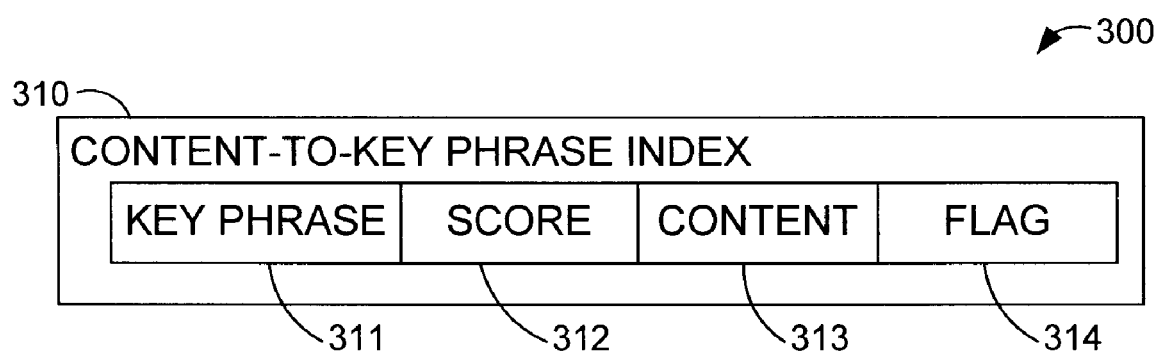
FIG. 3 is a block diagram that illustrates an exemplary content-to-key phrase index data structure, according to an embodiment of the present invention.

FIG. 3 is a block diagram that illustrates an exemplary content-to-key phrase index data structure 310, according to an embodiment of the present invention. The content-to-key phrase index data structure 310 includes a key phrase field 311 that stores the key phrases derived from the queries, a score field 312 that stores the scores associated with the respective key phrases, a content field 313 that stores the content or content locators associated with the respective key phrases, and a flag field 314 that stores the category information, such as seasonal, stable, dominant, tied-to-content or representative-of-content, associated with the respective key phrases. The content-to-key phrase index data structure 310 efficiently describes the relationships extracted from the query log and provides an interface to access the scores, and key phrases associated with content.

Embodiments of the present invention provide an extraction engine that processes query logs to generate a content-to-key phrase index having semantically meaningful key phrases for content. Search engines and query logs are monitored by the extraction engine to observe fluctuations in topic definitions associated with the content. The content-to-key phrase index provides a score and category indication that represents the strength of a relationship between the key phrases and content.

Figure 4:
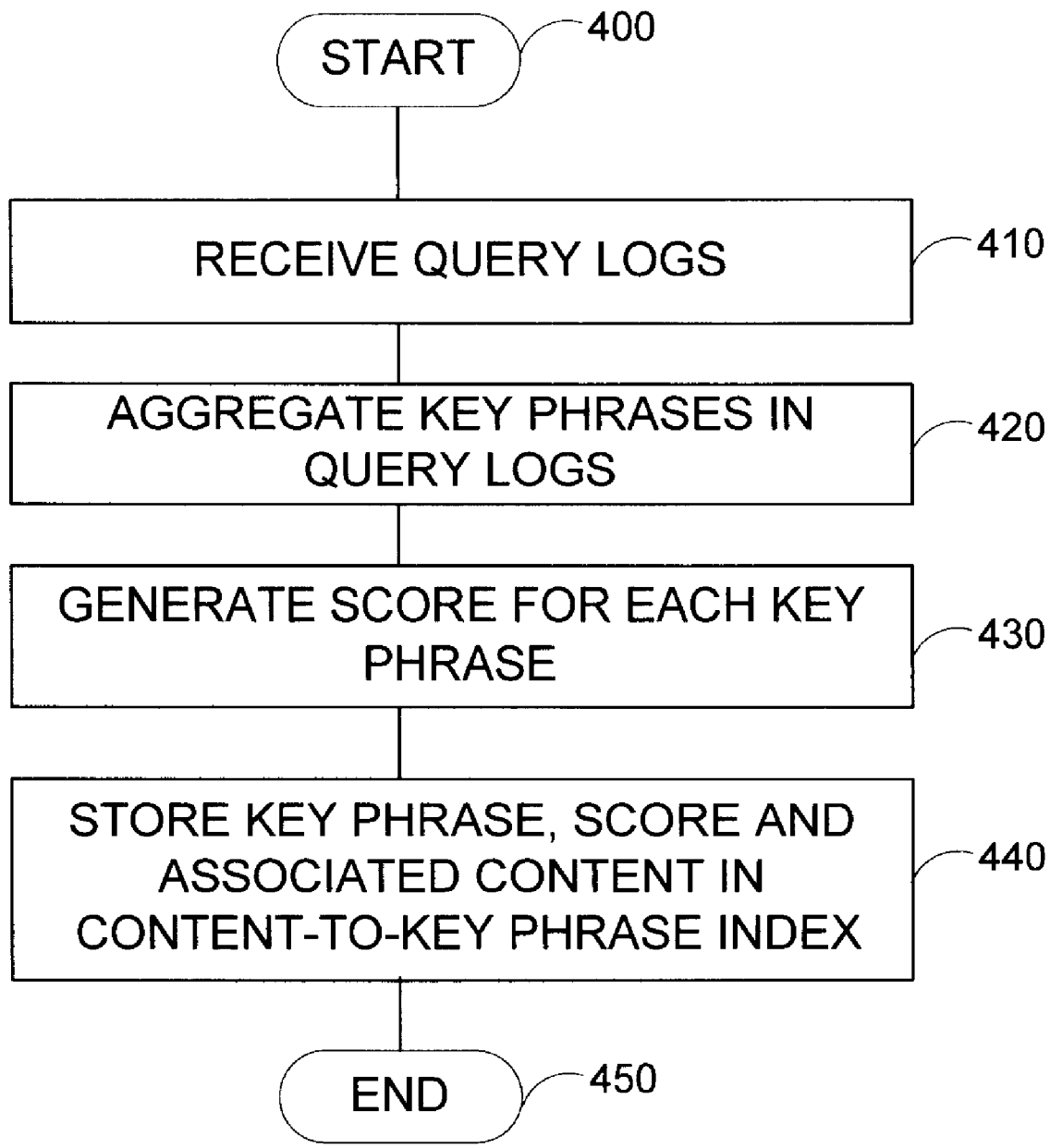
FIG. 4 is a logic diagram that illustrates an exemplary method for associating key phrases and content, according to an embodiment of the present invention.

FIG. 4 is a logic diagram that illustrates an exemplary method for associating key phrases and content according to an embodiment of the present invention. The extraction engine executes a method that begins in step 400 after query logs are generated by a search engine. In step 410, the query logs are received by the extraction engine. In step 420, the query logs are filtered to derive key phrases from the queries in the query logs and to generate key phrase-content pairs that are aggregated by the extraction engine. In turn, the extraction engine calculates a score for each key phrase in the key phrase-content pairs, in step 430. In step 440, a content-to-key phrase index that stores the key phrases, content, and scores is generated by the extraction engine.

A content-to-key phrase index, such as one created in accordance with the method described above with reference to FIG. 4, provides key phrases that are semantically meaningful. The content-to-key phrase index may be used in a number of applications in accordance with various embodiments of the present invention. For instance, in an embodiment, the content-to-key phrase index is utilized by a summary service to summarize content. In another embodiment, the content-to-key phrase index is utilized by an advertisement service to select advertisements relevant for the content.

In summary, a content-to-key phrase index may be generated from query logs generated by a search engine. The query logs provide key phrases that represent concepts a general population of users associates with content. Accordingly, the query logs provide a rich source for semantic information for content provided by search engines.

In an embodiment, the extraction engine includes a scorer component, a filter component, a categorizer component, a monitor component, a ranker component and an index generator component. The filter component processes the query logs to generate filtered query logs that are utilized by the scorer component to calculate scores for each key phrase derived from a query and included in the filtered query logs. The scores may be augmented by user interaction information provided by the monitor component. Additionally, the scores may be utilized by the categorizer component to classify the key phrases in categories that are represented by one or more flags stored in the content-to-key phrase index. The index generator component processes the scores, categories, and filtered query log to generate the content-to-key phrase index that includes the scores, the content, key phrases, and flags. The content-to-key phrase index may operate as a look-up table that returns key phrases based on content or content locators provided as a query criteria.

The foregoing descriptions of the invention are illustrative, and modifications in configuration and implementation will occur to persons skilled in the art. For instance, while the present invention has generally been described with relation to FIGS. 1-4, those descriptions are exemplary. Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims. The scope of the invention is accordingly intended to be limited only by the following claims.

We claim:

1. A computer-implemented method to associate key phrases stored in a search engine query log to content pages, the method comprising:
   receiving one or more search engine query logs having search queries and content locators for search results;
   filtering the search engine query logs based on specified metadata, wherein the specified metadata includes at least one of location information, user information, and temporal information;
   generating a score for each query;
   augmenting a score for the query based on user interactions with content for the query, wherein the user interactions includes at least one of click-through rates, click-through patterns, and dwell times;
   ranking and categorizing each query in the filtered search engine query log based on the score, wherein a query is categorized as a dominant key phrase when the score is above a threshold, a seasonal key phrase when the query is present in the filtered search engine query log over a recurrent interval of time, or a stable key phrase when the query is continuously present in the filtered search engine query log over a significant period time; and
   storing in a content-to-key phrase index, for each key phrase, the score, corresponding content, and an indication whether the key phrase is dominant, seasonal, or stable.

2. The method of claim 1, wherein an advertisement service utilizes the content-to-key phrase index to select advertisements for content based on the corresponding key phrases.

3. The method of claim 1, further comprising categorizing each key phrase as being tied-to-content or representative-of-content.

4. The method of claim 1, wherein a key phrase is tied-to-content when the key phrase is semantically unique and is frequently associated with a specific content.

5. The method of claim 4, wherein a key phrase is representative-of-content when the key phrase is associated with other content.

6. One or more computer-storage media storing instructions for executing a method to generate a content-to-key phrase index, the method comprising:
   logging user queries and webpage results;
   monitoring user interactions with the webpage results;
   generating a content-to-key phrase index based on the user queries and user interactions, wherein the content-to-key phrase index stores web pages and the dominant key phrases, seasonal key phrases, and the stable key phrases associated with the web pages; and updating the content-to-key phrase index based on ongoing user interaction, wherein updating the content-to-key phrase index further comprises;
   (1) generating a score that indicates whether a key phrase is stable or seasonal, and updating the content-to-key phrase index to reflect seasonal changes in user queries and webpage results, and
   (2) normalizing the score based on a number of webpage results associated with the key phrase.

7. The media of claim 6, wherein at least one of a temporal information, demographic information, and location information are stored with at least one of the dominant key phrases.

8. The media of claim 6, wherein the user interactions include at least one of a dwell time and click-through rates.

9. The media of claim 8, wherein normalizing the score includes determining a maximum number of search results provided by a search engine that receives the key phrase as a search term.

10. The media of claim 9, further comprising augmenting the score based on a search engine rank assigned to webpage results associated with the key phrase.

11. One or more computer-storage media storing thereon a content-to-key phrase index data structure, the content-to-key phrase index data structure comprising:
   a first field for content identifiers that are associate with key phrases;
   a second field for key phrases derived from queries, in a search engine query log, provided by one or more users
   a third field for scores associated with each key phrase, the scores quantifying relationships between the key phrases and the content associated with the content identifiers, wherein scores are augmented based on a rank assigned by a search engine that returned the content in response to the queries and user interactions, including dwell times, with the content; and
   a fourth field for categories associated with each key phrase, the categories identifying relationships between the key phrases and the content associated with the content identifiers, wherein categories include dominant, seasonal, stable, tied-to-content, or representative-of-content.

12. The media of claim 11, wherein the key phrases are utilized to select advertisements for content associated with the content identifiers.

13. The media of claim 11, wherein the key phrases are utilized to summarize the content associated with the content identifiers.

14. The media of claim 11, wherein the key phrases are ranked based on the scores.

15. The media of claim 11, wherein the key phrases are stored in a tied-to-content list based on semantic uniqueness and the scores associated with the key phrases.

16. The media of claim 11, wherein the key phrases are stored in a representative-of-content list based on semantic regularity and the scores associated with the key phrases.

* * * * *